US009145806B2

(12) United States Patent
Nakagami et al.

(10) Patent No.: US 9,145,806 B2
(45) Date of Patent: Sep. 29, 2015

(54) EXHAUST TREATMENT UNIT AND WORK VEHICLE HAVING EXHAUST TREATMENT UNIT

(71) Applicant: KOMATSU LTD., Tokyo (JP)

(72) Inventors: Hiroshi Nakagami, Hirakata (JP); Taira Ozaki, Ikoma (JP); Hironori Yamamitsu, Hirakata (JP); Takashi Katou, Oyama (JP); Yoshihisa Fujimoto, Oyama (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/239,876

(22) PCT Filed: Sep. 19, 2013

(86) PCT No.: PCT/JP2013/075252
§ 371 (c)(1),
(2) Date: Feb. 20, 2014

(87) PCT Pub. No.: WO2014/141513
PCT Pub. Date: Sep. 18, 2014

(65) Prior Publication Data
US 2015/0078967 A1 Mar. 19, 2015

Related U.S. Application Data

(63) Continuation of application No. PCT/JP2013/057519, filed on Mar. 15, 2013.

(51) Int. Cl.
F01N 3/00 (2006.01)
F01N 3/20 (2006.01)
(Continued)

(52) U.S. Cl.
CPC .............. F01N 3/2046 (2013.01); F01N 3/021 (2013.01); F01N 3/10 (2013.01); F01N 3/2066 (2013.01);
(Continued)

(58) Field of Classification Search
CPC .............. F01N 3/10; F01N 3/208; F01N 3/08; F01N 3/00; F01N 2430/00; B60K 13/04; E02F 9/00
USPC ............................. 60/274, 286, 295, 298, 320
See application file for complete search history.

(56) References Cited

U.S. PATENT DOCUMENTS 6,513,323 B1 * 2/2003 Weigl et al. ..................... 60/286
6,539,708 B1 * 4/2003 Hofmann et al. ............... 60/286
(Continued)

FOREIGN PATENT DOCUMENTS

CN       102575559 A       7/2012
DE   10 2014 003 639 A1   9/2014
(Continued)

OTHER PUBLICATIONS

The International Search Report for the corresponding international application No. PCT/JP2013/075252, issued on Mar. 15, 2013.
(Continued)

Primary Examiner — Thomas Denion
Assistant Examiner — Matthew T Largi
(74) Attorney, Agent, or Firm — Global IP Counselors, LLP

(57) ABSTRACT

An exhaust treatment unit for a work vehicle includes a selective catalytic reduction apparatus, a connection pipe, an ejection apparatus attached to the connection pipe, a first pipe section that guides coolant to the ejection apparatus, a second pipe section that discharges coolant from the ejection apparatus, first and second retaining sections, and a coolant pump. The ejection apparatus ejects reducing agent into exhaust supplied to the selective catalytic reduction apparatus. The first and second retaining sections retain coolant and are connected to the first and second pipe sections above the ejection apparatus, respectively. The coolant pump is driven by an engine driving force and supplies the coolant to the ejection apparatus via the first pipe section. The first and second pipe sections extend upward from first and second connecting sections of the first and second pipe sections and the ejection apparatus toward the first and second retaining sections, respectively.

13 Claims, 10 Drawing Sheets

(51) Int. Cl.
*F01N 3/10* (2006.01)
*F01N 3/24* (2006.01)
*F01N 13/18* (2010.01)
*F01N 3/021* (2006.01)

(52) U.S. Cl.
CPC .............. *F01N 3/24* (2013.01); *F01N 13/1805* (2013.01); *F01N 2590/08* (2013.01); *F01N 2610/11* (2013.01); *F01N 2610/1453* (2013.01)

(56) References Cited

U.S. PATENT DOCUMENTS

| | | | |
|---|---|---|---|
| 7,449,162 B2* | 11/2008 | Schaller et al. | 423/212 |
| 2007/0092413 A1* | 4/2007 | Hirata et al. | 422/177 |
| 2007/0266699 A1* | 11/2007 | Ripper et al. | 60/282 |
| 2008/0134677 A1 | 6/2008 | Onodera | |
| 2009/0217650 A1* | 9/2009 | Haeberer et al. | 60/297 |
| 2009/0229258 A1* | 9/2009 | Zapf et al. | 60/295 |
| 2010/0242439 A1 | 9/2010 | Domon et al. | |
| 2010/0319326 A1* | 12/2010 | Haeberer et al. | 60/286 |
| 2011/0120085 A1 | 5/2011 | Saito et al. | |
| 2013/0081377 A1* | 4/2013 | Burger | 60/273 |
| 2013/0186073 A1* | 7/2013 | Onodera et al. | 60/277 |
| 2013/0219871 A1* | 8/2013 | Crandell et al. | 60/295 |
| 2013/0283769 A1* | 10/2013 | Watanabe et al. | 60/274 |
| 2014/0245722 A1* | 9/2014 | Naik et al. | 60/286 |
| 2014/0260199 A1 | 9/2014 | Grzesiak et al. | |

FOREIGN PATENT DOCUMENTS

| | | | |
|---|---|---|---|
| JP | 59-174320 U | | 11/1984 |
| JP | 62-63118 A | | 3/1987 |
| JP | 7-332182 A | | 12/1995 |
| JP | 2006-226236 A | | 8/2006 |
| JP | 2008-169711 A | | 7/2008 |
| JP | 2009-103013 A | | 5/2009 |
| JP | 2011-140853 A | | 7/2011 |
| JP | 2012-107578 A | | 6/2012 |
| JP | WO 2012/090800 | * | 7/2012 |
| JP | 2013-11109 A | | 1/2013 |
| JP | 2013-47488 A | | 3/2013 |

OTHER PUBLICATIONS

The International Search Report for the corresponding international application No. PCT/JP2013/057519, issued on Jun. 11, 2013.
The Office Action for the corresponding German patent application No. 11 2013 000 161.6, issued on Mar. 12, 2015.
The Office Action for the corresponding Chinese patent application No. 201380002753.X, issued on Apr. 29, 2015.

* cited by examiner

EXHAUST TREATMENT UNIT AND WORK VEHICLE HAVING EXHAUST TREATMENT UNIT

CROSS-REFERENCE TO RELATED APPLICATIONS

This application is a U.S. National stage application of International Application No. PCT/JP2013/075252, filed on Sep. 19, 2013, which claims priority to International Application No. PCT/JP2013/057519, filed on Mar. 15, 2013, the entire contents of which are hereby incorporated herein by reference.

BACKGROUND

Field of the Invention

The present invention relates to an exhaust treatment unit which cleans exhaust from a work vehicle and a work vehicle in which the exhaust treatment unit is installed.

Background Information Diesel engines are typically used as the engines of work vehicles. Exhaust discharged from diesel engines includes a large amount of nitrogen oxides. In order to clean the nitrogen oxides, the work vehicle is provided with an exhaust treatment unit (for example, refer to Japanese Laid Open Patent Application Publication No. 2011-140853).

The exhaust treatment unit is provided with an ejection apparatus and a selective catalytic reduction (SCR) apparatus. The ejection apparatus ejects a reducing agent solution into the exhaust at the upstream side of the selective catalytic reduction apparatus. Hence, nitrogen oxides in the exhaust discharged from the engine are reduced to nitrogen. The ejection apparatus is cooled by coolant so as not to be heated by the radiant heat from the engine or the heat of the exhaust (for example, refer to Japanese Laid Open Patent Application Publication No. 2008-169711).

The invention according to Japanese Laid Open Patent Application Publication No. 2008-169711 circulates coolant between the ejection apparatus and a radiator using a coolant pump which is driven by electricity in order not for the coolant to be vaporized to increase the temperature of the ejection apparatus, which causes chemical changes in the reducing agent solution to generate deposits. Hence, the coolant is kept at a constant temperature or less and the coolant is prevented from being vaporized.

SUMMARY

In work vehicles, pumps activated directly by the driving force of an engine are generally used as coolant pumps. It is not possible to drive a pump which is driven by the engine when the engine is stopped. Accordingly, in a case where the engine is stopped, circulation of the coolant stops, the coolant is vaporized due to residual heat in the vicinity of the ejection apparatus, and the cooling function is diminished. When the cooling function of the ejection apparatus is diminished, solvent in the reducing agent which remains inside the ejection apparatus is vaporized, deposits are generated due to precipitation of solute or changes in the solute which is precipitated, and the functions of the ejection apparatus are impaired. The present invention takes into consideration the problems described above.

An exhaust treatment unit according to a first aspect of the present invention is an exhaust treatment unit treating exhaust from an engine and is provided with a selective catalytic reduction apparatus, a connection pipe, an ejection apparatus, a first pipe section, a second pipe section, a first retaining section, a second retaining section, and a coolant pump. The selective catalytic reduction apparatus treats exhaust from the engine. The connection pipe is installed between the engine and the selective catalytic reduction apparatus. The ejection apparatus is attached to the connection pipe and ejects a reducing agent into the exhaust supplied to the selective catalytic reduction apparatus. The first pipe section guides coolant for cooling the ejection apparatus to the ejection apparatus. The second pipe section discharges the coolant from the ejection apparatus. The first retaining section retains the coolant and is connected to the first pipe section above the ejection apparatus. The second retaining section retains the coolant and is connected to the second pipe section above the ejection apparatus. The coolant pump is driven by receiving driving force from the engine and supplies the coolant to the ejection apparatus via the first pipe section. The first pipe section extends upward from a first connecting section of the first pipe section and the ejection apparatus toward the first retaining section. The second pipe section extends upward from a second connecting section of the second pipe section and the ejection apparatus toward the second retaining section.

The second retaining section may have a larger capacity than the first retaining section and may be arranged above the first retaining section.

The exhaust treatment unit may be further provided with one base plate which supports the first retaining section and the second retaining section. Then, the first retaining section, the second retaining section, and the base plate may be integrally formed.

The second retaining section may include a first sub-tank and a second sub-tank. The first sub-tank connects with one surface of the base plate. The second sub-tank connects with the other surface of the base plate. An opening which links the first sub-tank and the second sub-tank may be provided in the base plate.

As another configuration of the exhaust treatment unit, the first retaining section and the second retaining section may be connected.

The exhaust treatment unit may be further provided with one base plate which supports the first retaining section and the second retaining section. The first retaining section may be connected to one surface of the base plate. The second retaining section may be connected to the other surface of the base plate.

The first retaining section, the second retaining section, and the base plate may be integrally formed. Then, a hole connecting the first retaining section and the second retaining section may be provided in the base plate.

Among bubbles generated in the vicinity of the ejection apparatus due to the coolant vaporization, bubbles from the second connecting section toward the second retaining section are more numerous than bubbles from the first connecting section toward the first retaining section.

A fourth connecting section connecting the second pipe section to the second retaining section may be above a third connecting section connecting the first pipe section to the first retaining section.

A lower end of the second retaining section may be above a lower end of the first retaining section.

The exhaust treatment unit may be further provided with a third pipe section and a fourth pipe section. The third pipe section connects the engine and the first retaining section. The third pipe section guides coolant for cooling the ejection apparatus to the first retaining section. The fourth pipe section connects the engine and the second retaining section and guides coolant discharged from the ejection apparatus to the engine. The first pipe section and the third pipe section may be connected to a first side surface of the first retaining section. The second pipe section and the fourth pipe section may be connected to a second side surface of the second retaining section.

The first side surface may be the side surface nearest to the ejection apparatus out of the side surfaces of the first retaining section. The second side surface may be the side surface nearest to the ejection apparatus out of the side surfaces of the second retaining section.

The third pipe section may be connected to the first retaining section above the first pipe section. The fourth pipe section may be connected to the second retaining section above the second pipe section.

A work vehicle according to a second aspect of the present invention is provided with the exhaust treatment unit described above, an engine, and a working implement. The engine outputs driving force.

The exhaust treatment unit and the work vehicle according to the present invention are provided with a first retaining section and a second retaining section which retain coolant and are positioned above the ejection apparatus. Then, the first retaining section and the second retaining section are connected to the ejection apparatus respectively via the first pipe section and the second pipe section which extend upward. As a result, heat convection is generated. In the heat convection, the coolant which is vaporized in the vicinity of the ejection apparatus rises to the first retaining section or the second retaining section and is cooled, and the coolant which remains in the first retaining section, the second retaining section, the first pipe section, or the second pipe section falls to the ejection apparatus. Accordingly, the coolant in the vicinity of the ejection apparatus is prevented from being vaporized even if the coolant pump is not operating when the engine is stopped. Hence, generation of deposits from the reducing agent which is precipitated by the solvent of the reducing agent solution becoming a gas or due to changes in the precipitated reducing agent, is prevented.

DETAILED DESCRIPTION OF THE EMBODIMENT(S)

Figure 1:
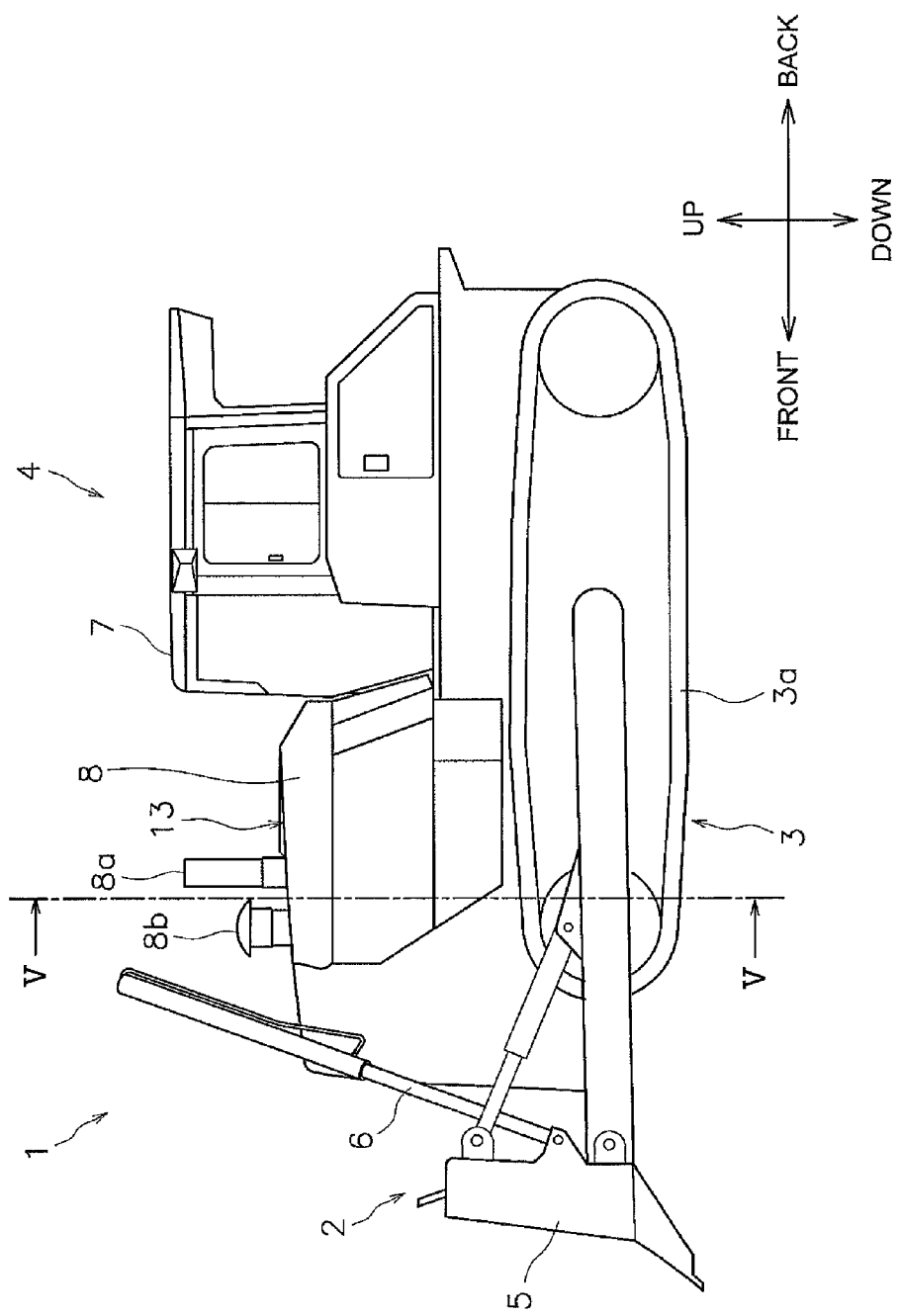
FIG. 1 is a left side view of a work vehicle according to an embodiment of the present invention.
Figure 2:
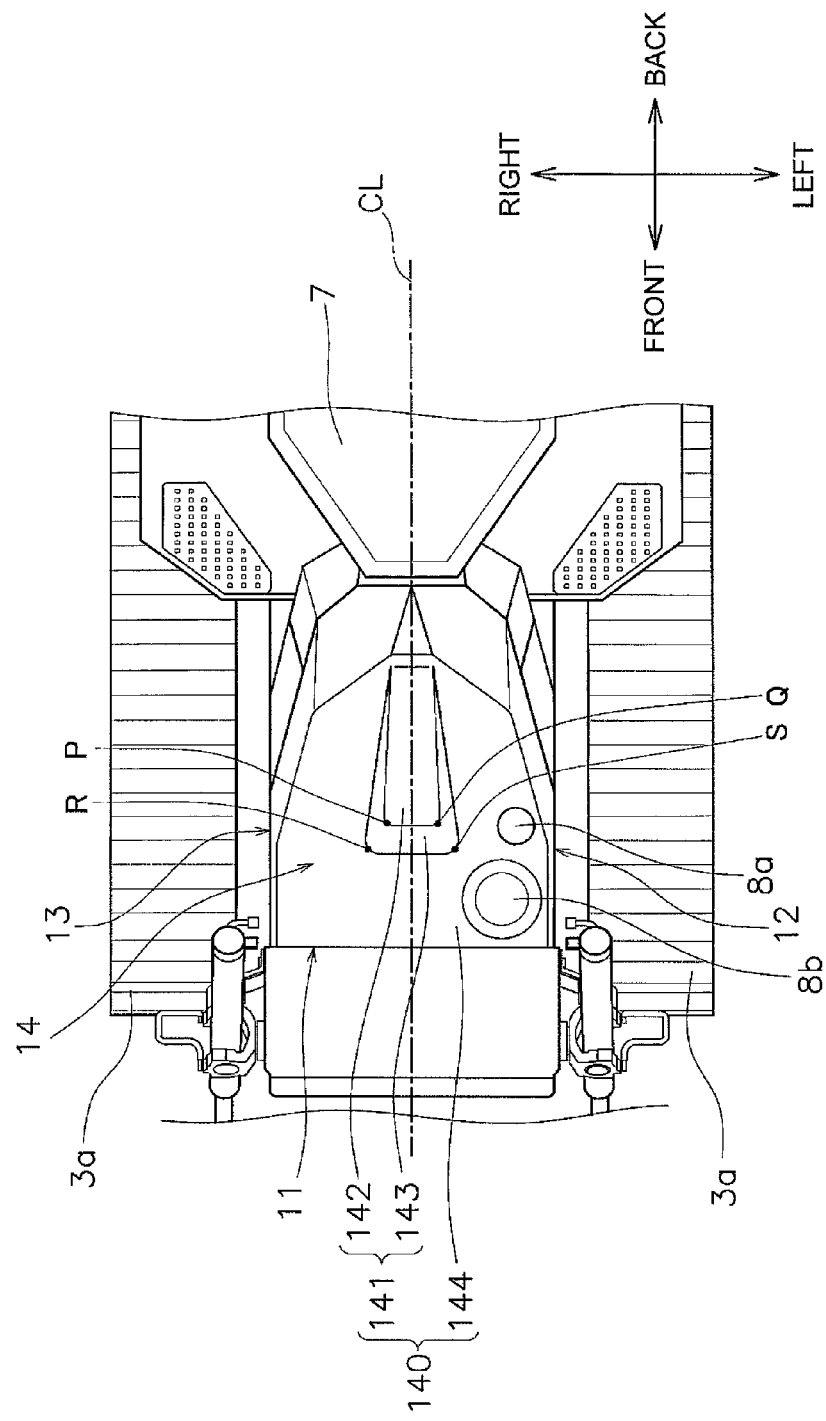
FIG. 2 is a top view which illustrates a portion of the work vehicle according to an embodiment of the present invention.

FIG. 1 is a side view of a work vehicle 1 according to an embodiment of the present invention. FIG. 2 is a top view which illustrates a portion of the work vehicle 1 according to an embodiment of the present invention. Here, in the description below, front and back direction means front and back direction of the work vehicle 1. In other words, the front and back direction means the front and back direction viewed by an operator seated in a cab (operator house) 7. In addition, left and right direction or to the side mean vehicle width direction of the work vehicle 1. In other words, left and right direction, the vehicle width direction, or to the side mean the left and right direction viewed by the operator described above. Here, the work vehicle 1 is, for example, a bulldozer in the present embodiment.

The work vehicle 1 comprises a working implement 2, a traveling apparatus 3, and a vehicle body 4. The working implement 2 has a blade 5 and hydraulic cylinders 6. The blade 5 is arranged in front of the vehicle body 4. The hydraulic cylinders 6 are actuated by hydraulic pressure which is generated by a hydraulic pump (which is not shown in the diagram) and move the blade 5 up and down. The traveling apparatus 3 is an apparatus for running the vehicle, and has a pair of crawler belts 3a. The work vehicle 1 runs due to the crawler belts 3a being driven. The vehicle body 4 has the cab (operator house) 7 and an engine compartment 8.

A cab 7 is arranged behind the engine compartment 8. A sheet and an operation apparatus which are not shown in the diagram are installed inside the cab 7. The engine compartment 8 is arranged in front of the cab 7. The width of the engine compartment 8 is limited to within the space between the pair of crawler belts 3a since the engine compartment 8 is interposed between the pair of crawler belts 3a. The engine compartment 8 has a vehicle body frame which is not shown in the diagram, a roof section 11, a first side wall section 12, and a second side wall section 13. The first side wall section 12 and the second side wall section 13 will be collectively called a side wall section in the description below.

The roof section 11 covers the upper part of the engine compartment 8. A rear section of the roof section 11 has a tapered shape such that the width gets smaller towards the rear side. A removable engine hood 14 is provided in the rear section of the roof section 11. The first side wall section 12 is provided along the front and back direction and covers the left of the engine compartment 8. The second side wall section 13 is provided along the front and back direction and covers the right of the engine compartment 8. The first side wall section 12 and the second side wall section 13 have shapes which are left and right symmetrical relative to each other with respect to a center line CL along the front and back direction of the work vehicle 1 and are separated in the vehicle width direction. The center line CL is a reference line which passes through the middle of the first side wall section 12 and the second side wall section 13 in the vehicle width direction.

As shown in FIG. 2, the engine hood 14 covers the upper part of the engine compartment 8. That is, the engine hood 14 covers the upper parts of an exhaust treatment unit 40 and an engine 31 which will be described later. The engine hood 14 is arranged in front of the cab 7. In other words, the cab 7 is arranged behind the engine hood 14. The engine hood 14 has shapes which are left and right symmetrical relative to each other with respect to the center line CL along the front and back direction of the work vehicle 1. The engine hood 14 has at least an upper surface 140.

The upper surface 140 has a convex section 141 and a base section 144. The convex section 141 is positioned at a rear portion of the upper surface 140. The convex section 141 is positioned in the center of the upper surface 140 in the vehicle width direction. The convex section 141 has a substantially trapezoidal shape in a top view of the vehicle. The convex section 141 is arranged such that the longitudinal direction of the convex section 141 is along the vehicle front and back direction. The convex section 141 is arranged such that two bases thereof which constitute the trapezoidal shape of the convex section 141 extend along the vehicle front and back direction. The convex section 141 has a convex section upper surface 142 and a convex section inclined surface 143. The convex section upper surface 142 is a horizontal flat surface (refer to FIG. 4). The convex section inclined surface 143 is a flat surface which is inclined toward the base section 144 from the convex section upper surface 142. The base section 144 is inclined toward the front of the vehicle, so that the width of the convex section inclined surface 143 is widened heading toward the front of the vehicle. The base section 144 is integrally formed with the convex section 141 and is arranged below the convex section 141. The base section 144 is inclined toward the front of the vehicle (refer to FIG. 1 and FIG. 4). The length of the base section 144 in the vehicle width direction is shortened heading toward the vehicle rear in a top view of the vehicle.

Configuration of Inner Section of Engine Compartment

Figure 3:
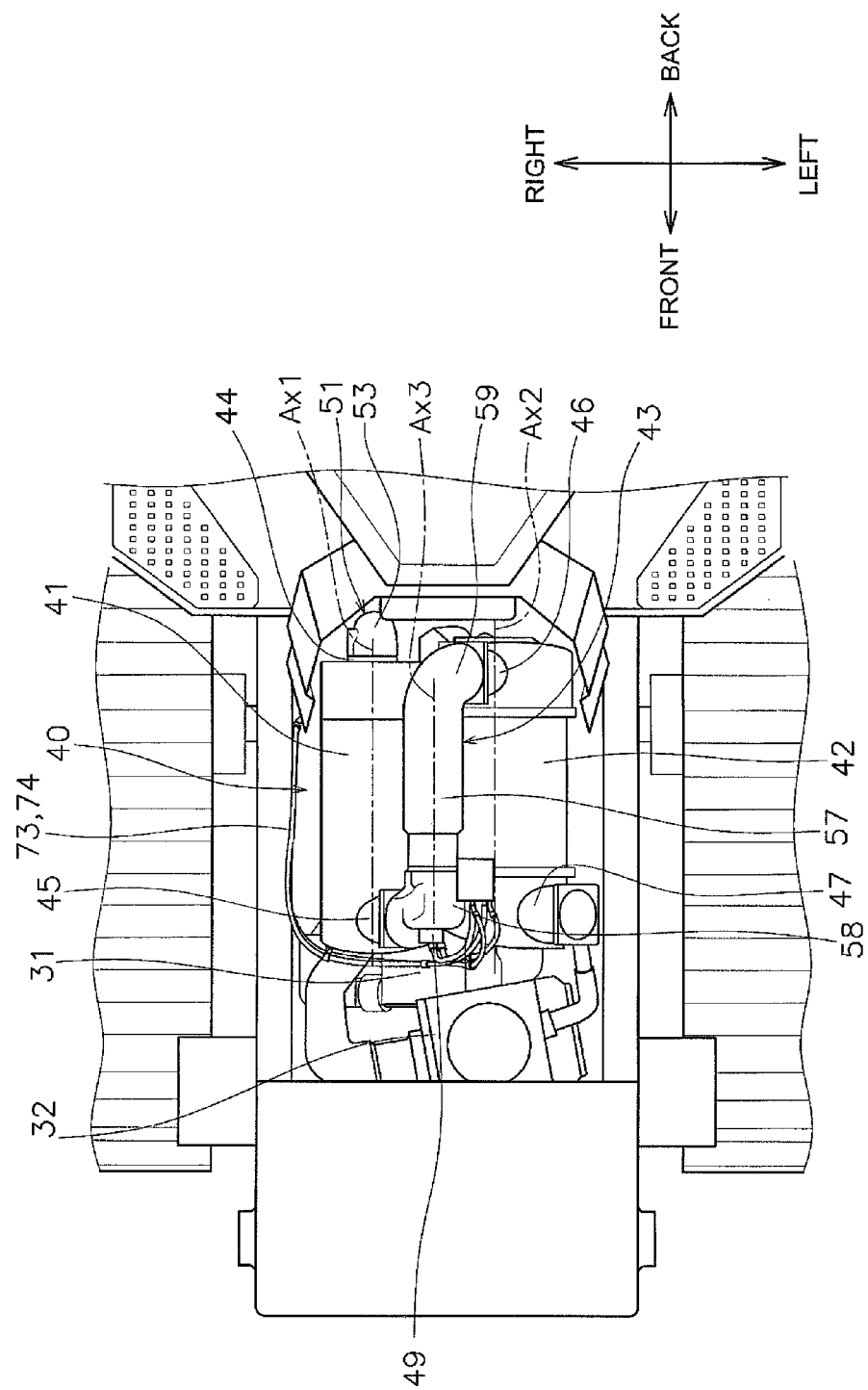
FIG. 3 is a top view which illustrates an inner configuration of an engine compartment.
Figure 4:
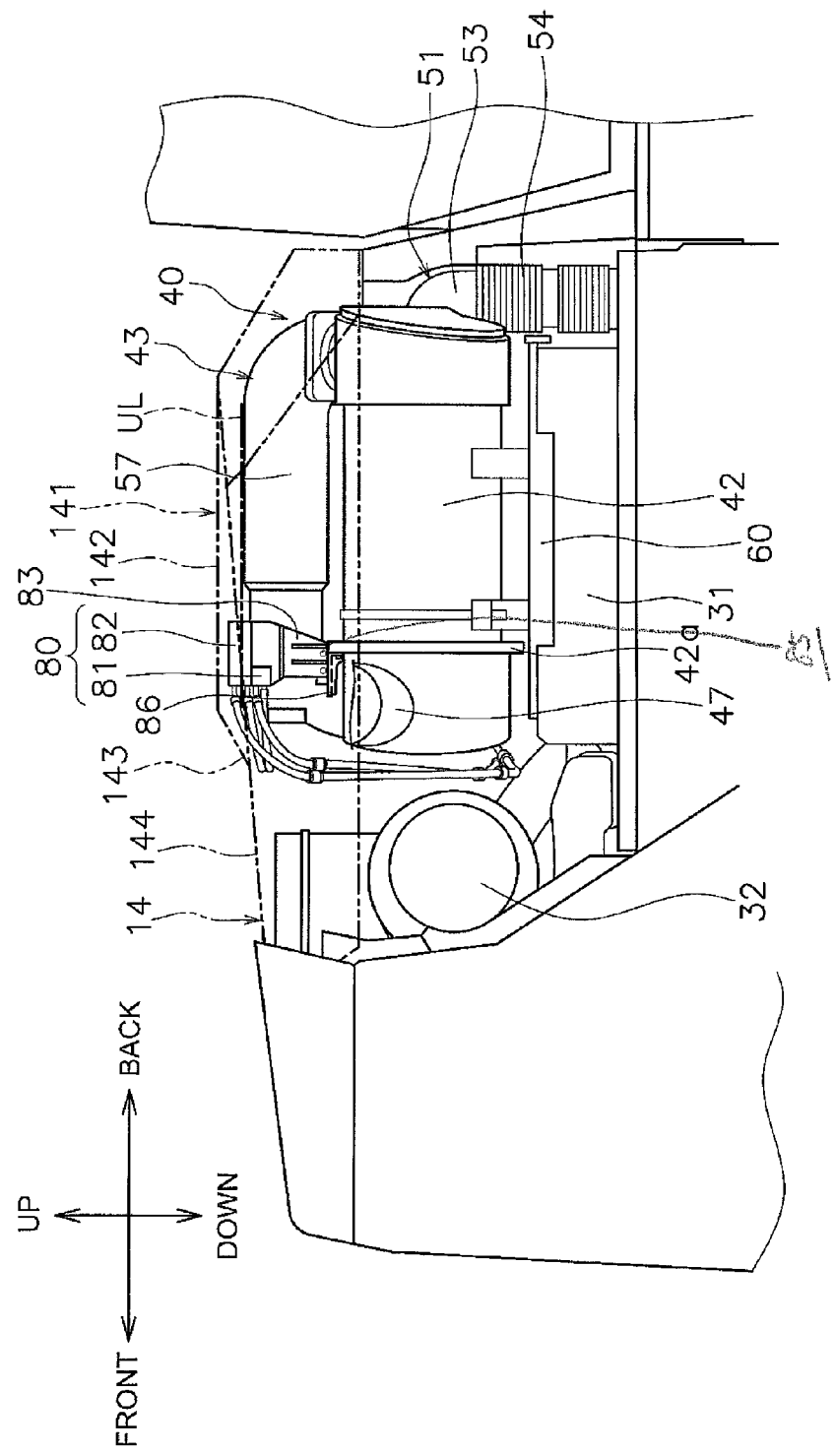
FIG. 4 is a side view which illustrates an inner configuration of the engine compartment.
Figure 5:
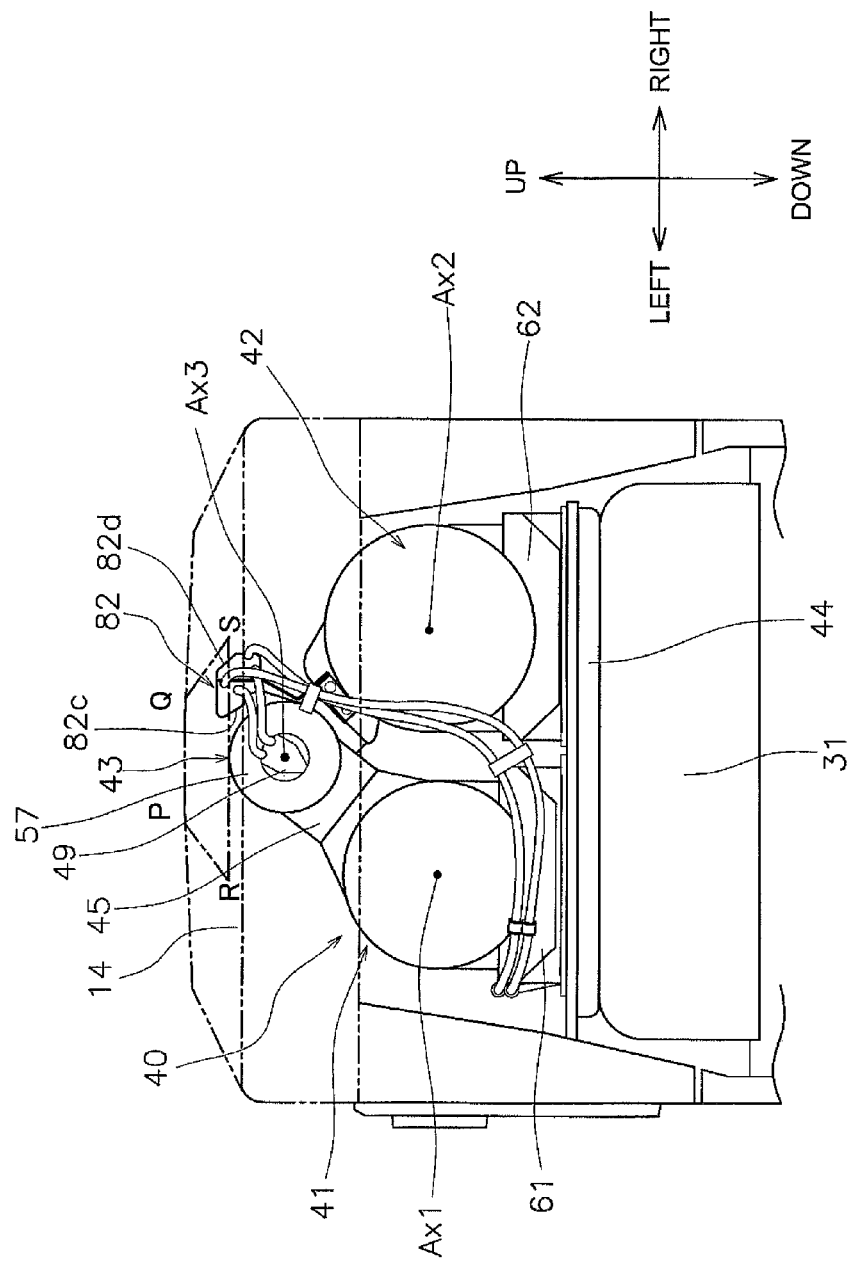
FIG. 5 is a cross-section view of the engine compartment viewed from a cross sectional line V-V in FIG. 1.

FIG. 3 is a top view which illustrates an inner configuration of the engine compartment 8. FIG. 4 is a side view which illustrates the inner configuration of the engine compartment 8. FIG. 5 is a cross-section view of the engine compartment 8 viewed from a cross sectional line V-V in FIG. 1. FIG. 4 displays the engine compartment 8 while omitting a portion of the constitutional elements in FIG. 1. FIG. 5 displays the engine compartment 8 while omitting a portion of the constitutional elements in FIG. 4. In addition, the engine hood 14 is displayed by a two-dot chain line in FIG. 4 and FIG. 5. The engine 31, an air cleaner 32, a radiator (which is not shown in the diagrams), a cooler 15 (refer to FIG. 7), and an exhaust treatment unit 40 are accommodated in the engine compartment 8. That is, the work vehicle 1 is further provided with the engine 31, the cooler 15, and the exhaust treatment unit 40.

The engine 31 is, for example, a diesel engine and outputs driving force for driving a coolant pump 75 (refer to FIG. 8) which will be described later and the traveling apparatus 3. The engine 31 is arranged below the engine hood 14. Furthermore, the engine 31 is arranged below the exhaust treatment unit 40 and the air cleaner 32. As shown in FIG. 4, the air cleaner 32 is arranged in front of the exhaust treatment unit 40 in the engine compartment 8. An air intake pipe 8b (refer to FIG. 1 and FIG. 2) which protrudes from the engine hood 14 is connected to the air cleaner 32. A radiator 15 (refer to FIG. 8) is arranged in front of the air cleaner 32 in the engine compartment 8. The radiator 15 is an apparatus for cooling a coolant which circulates between the engine 31 and an ejection apparatus 49 which will be described later. The radiator 15 is configured such that it is possible for air to pass in the front and back direction.

As shown in FIG. 4 and FIG. 5, the exhaust treatment unit 40 is arranged below the engine hood 14 and above the engine 31. The exhaust treatment unit 40 has a first exhaust treatment apparatus 41, a second exhaust treatment apparatus 42, a second connection pipe 43, and a bracket 60.

In the present embodiment, the first exhaust treatment apparatus 41 is, for example, a diesel particulate filter apparatus and treats exhaust from the engine 31. The first exhaust treatment apparatus 41 captures particulate matter in the exhaust using a filter. The first exhaust treatment apparatus 41 incinerates the captured particulate matter using a heater installed in the filter.

The first exhaust treatment apparatus 41 has a substantially cylindrical outer shape. As shown in FIG. 5, the first exhaust treatment apparatus 41 is arranged below the engine hood 14 and above the engine 31. As shown in FIG. 3, the first exhaust treatment apparatus 41 is arranged such that a center axis line Ax1 thereof is along the vehicle front and back direction. That is, the first exhaust treatment apparatus 41 is arranged such that the longitudinal direction thereof is along the vehicle front and back direction. Accordingly, the first exhaust treatment apparatus 41 is arranged such that the center axis line Ax1 thereof is parallel to the crank shaft of the engine 31.

In the present embodiment, the second exhaust treatment apparatus 42 is, for example, a selective catalytic reduction apparatus and treats exhaust from the engine 31. The second exhaust treatment apparatus 42 selectively reduces nitrogen oxide (NOx) by hydrolysis of the reducing agent.

The second exhaust treatment apparatus 42 has a substantially cylindrical outer shape. As shown in FIG. 4 and FIG. 5, the second exhaust treatment apparatus 42 is arranged below the engine hood 14 and above the engine 31. As shown in FIG. 3, the second exhaust treatment apparatus 42 is arranged such that a center axis line Ax2 thereof is along the vehicle front and back direction. That is, the second exhaust treatment apparatus 42 is arranged such that a longitudinal direction thereof is along the vehicle front and back direction. Accordingly, the second exhaust treatment apparatus 42 is arranged such that the center axis line Ax2 is parallel to the crank shaft of the engine 31. In addition, the second exhaust treatment apparatus 42 is arranged such that the center axis line Ax2 is parallel to the center axis line Ax1 of the first exhaust treatment apparatus 41. Furthermore, as shown in FIG. 5, the first exhaust treatment apparatus 41 and the second exhaust treatment apparatus 42 are arranged to come close to each other.

As shown in FIG. 3, the first exhaust treatment apparatus 41 has a first connection port 44. As shown in FIG. 3 and FIG. 4, the work vehicle 1 is provided with a first connection pipe 51. The first connection pipe 51 links the engine 31 and the first exhaust treatment apparatus 41.

The first connection pipe 51 has a first curved section 53 and a bellows section 54. As shown in FIG. 3, the first curved section 53 links the bellows section 54 and the first connection port 44. The first connection pipe 51 is connected to the engine 31 in the edge section other than the edge section connected to the first connection port 44. The bellows section 54 is in a bellows shape and can extend and contract. The bellows section 54 is linked to a plurality of bellows expansion and contraction joints. The bellows section 54 is arranged substantially along the vertical direction.

As shown in FIG. 3, the first exhaust treatment apparatus 41 has a second connection port 45. The second connection port 45 protrudes obliquely upward and toward a side of the second exhaust treatment apparatus 42. The second exhaust treatment apparatus 42 has a third connection port 46. The third connection port 46 protrudes obliquely upward and towards a side of the first exhaust treatment apparatus 41.

The exhaust treatment unit 40 has the second connection pipe 43. As shown in FIG. 3, one end of the second connection pipe 43 is connected to the second connection port 45 of the first exhaust treatment apparatus 41. The other end of the second connection pipe 43 is connected to the third connection port 46 of the second exhaust treatment apparatus 42. That is, the second connection pipe 43 is a relay connection pipe which connects the first exhaust treatment apparatus 41 and the second exhaust treatment apparatus 42. As shown in FIG. 5, the second connection pipe 43 is arranged above the first exhaust treatment apparatus 41 and the second exhaust treatment apparatus 42. Then, the convex section 141 protrudes above the second connection pipe 43. In addition, as shown in FIG. 3, the second connection pipe 43 is arranged so as to overlap with the first exhaust treatment apparatus 41 and the second exhaust treatment apparatus 42 in a top view of the vehicle.

As shown in FIG. 3, the second connection pipe 43 has a main pipe section 57, a first connecting section 58, and a second connecting section 59. The main pipe section 57 has a substantially cylindrical shape. As shown in FIG. 5, the main pipe section 57 is positioned above the first exhaust treatment apparatus 41 and the second exhaust treatment apparatus 42. In detail, a center axis line Ax3 of the main pipe section 57 is positioned above an upper end of the cylindrical shape of the first exhaust treatment apparatus 41 and an upper end of the cylindrical shape of the second exhaust treatment apparatus 42. Accordingly, the upper end of the main pipe section 57 is positioned above the upper end of the cylindrical shape of the first exhaust treatment apparatus 41 and the upper end of the cylindrical shape of the second exhaust treatment apparatus 42.

As shown in FIG. 3, the main pipe section 57 is arranged such that the center axis line Ax3 thereof is along the vehicle front and back direction. That is, the main pipe section 57 is arranged such that the longitudinal direction thereof is along the vehicle front and back direction. Accordingly, the main pipe section 57 is arranged such that the center axis line Ax3 of the main pipe section 57 is parallel to the crank shaft of the engine 31. In addition, the main pipe section 57 is arranged such that the center axis line Ax3 is parallel with regard to the center axis line Ax1 of the first exhaust treatment apparatus 41 and the center axis line Ax2 of the second exhaust treatment apparatus 42. The length of the second connection pipe 43 in the direction of the center axis line Ax3 is substantially the same as the length of the first exhaust treatment apparatus 41 or the length of the second exhaust treatment apparatus 42.

The first connecting section 58 links the main pipe section 57 and the second connection port 45. That is, the first connecting section 58 is connected to the main pipe section 57 and the first exhaust treatment apparatus 41. The second connecting section 59 links the main pipe section 57 and the third connection port 46. That is, the second connecting section 59 is connected to the main pipe section 57 and the second exhaust treatment apparatus 42. The ejection apparatus 49 is attached in the first connecting section 58. That is, the exhaust treatment unit 40 is further provided with the ejection apparatus 49. The ejection apparatus 49 ejects reducing agent into the exhaust which is supplied to the second exhaust treatment apparatus 42 through the second connection pipe 43. The reducing agent is, for example, an aqueous solution of urea (referred to below as aqueous urea). The aqueous urea which is ejected becomes ammonia due to being hydrolyzed by the exhaust heat and the ammonia is supplied to the second exhaust treatment apparatus 42 along with the exhaust via the second connection pipe 43 and works as a reducing agent. In the present invention, the reducing agent solution which is ejected by the ejection apparatus 49 will simply be referred to as the reducing agent for convenience of explanation.

As shown in FIG. 3 and FIG. 4, the second exhaust treatment apparatus 42 has a fourth connection port 47. The fourth connection port 47 protrudes obliquely upwards. The work vehicle 1 is provided with an exhaust pipe 8a. The exhaust pipe 8a is connected to the fourth connection port 47. As shown in FIG. 1, an upper section of the exhaust pipe 8a protrudes upwards from the engine hood 14. As shown in FIG. 2, the exhaust pipe 8a and the air intake pipe 8b are eccentric to a side of the first side wall section 12 with respect to the center line CL along the front and back direction of the work vehicle 1.

The engine 31, the first connection pipe 51, the first exhaust treatment apparatus 41, the second connection pipe 43, the second exhaust treatment apparatus 42, and the exhaust pipe 8a are sequentially connected in series. Accordingly, the exhaust from the engine 31 passes through the first connection pipe 51 and is fed into the first exhaust treatment apparatus 41. Particulate matter is mostly reduced from the exhaust in the first exhaust treatment apparatus 41. Next, the exhaust passes through the second connection pipe 43 and is fed into the second exhaust treatment apparatus 42. NOx is mostly reduced in the second exhaust treatment apparatus 42. After this, the cleaned exhaust passes through the exhaust pipe 8a and is discharged to the outside.

Figure 6:
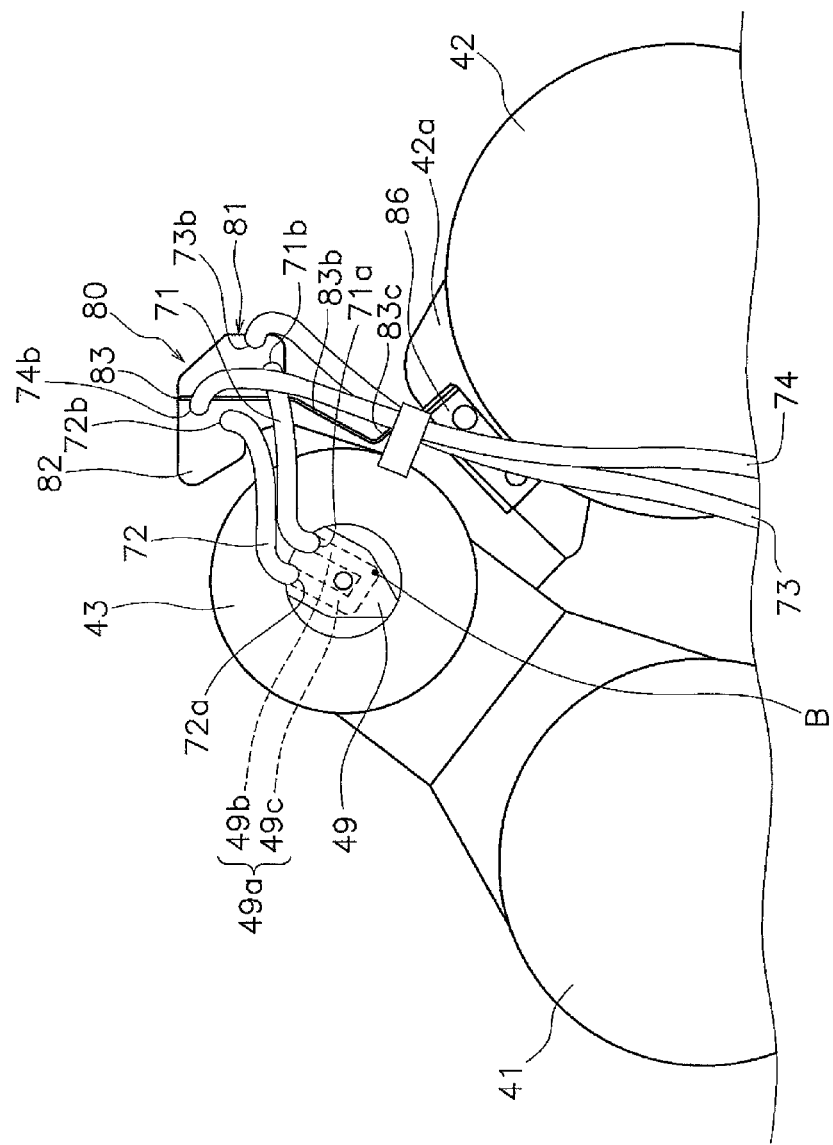
FIG. 6 is an enlarged view where the vicinity of the ejection apparatus in FIG. 5 is enlarged.

As shown in FIG. 4 and FIG. 5, the first exhaust treatment apparatus 41 and the second exhaust treatment apparatus 42 are attached to the bracket 60. As shown in FIG. 6, the bracket 60 has a first support section 61 which supports the first exhaust treatment apparatus 41 and a second support section 62 which supports the second exhaust treatment apparatus 42.

The first exhaust treatment apparatus 41 is fixed onto the bracket 60 by a U-bolt being attached to the first support section 61. In a similar manner, the second exhaust treatment apparatus 42 is fixed onto the bracket 60 by a U-bolt being attached to the second support section 62. The bracket 60 is supported by the engine 31 via a plurality of support members which are not shown in the diagrams. That is, the first exhaust treatment apparatus 41, the second exhaust treatment apparatus 42, and the second connection pipe 43 are supported by the engine 31 via the bracket 60.

Configuration for Cooling Ejection Apparatus 49

FIG. 6 is an enlarged view where the vicinity of the ejection apparatus in FIG. 5 is enlarged. As shown in FIG. 6, the ejection apparatus 49 has a coolant flow path 49a in which flows coolant for cooling the main body of the ejection apparatus 49. A first pipe section 71 and a second pipe section 72 which will be described later are connected to the coolant flow path 49a and the ejection apparatus 49 is cooled by the coolant flowing inside the coolant flow path. Here, the coolant is typically water.

The exhaust treatment unit 40 is further provided with the first pipe section 71, the second pipe section 72, a first retaining section 81 and a second retaining section 82. As shown in FIG. 6, the first pipe section 71 is connected to the ejection apparatus 49 at a first connecting section 71a which is one end of the first pipe section 71. The first pipe section 71 is connected to the first retaining section 81 at a third connecting section 71b which is the other end of the first pipe section 71. The first pipe section 71 extends upward from the first connecting section 71a toward the first retaining section 81. In more detail, the first pipe section 71 extends obliquely upward from the first connecting section 71a toward the first retaining section 81. The second pipe section 72 is connected to the ejection apparatus 49 at the second connecting section 72a which is one end of the second pipe section 72. The second pipe section 72 is connected to the second retaining section 82 at a fourth connecting section 72b which is the other end of the second pipe section 72. The second pipe section 72 extends upward from the second connecting section 72a toward the second retaining section 82. In more detail, the second pipe section 72 extends obliquely upward from the second connecting section 72a toward the second retaining section 82.

It is possible for the coolant flow path 49a to be divided into a first flow path 49b from a lowest point B toward the first pipe section 71 and a second flow path 49c from the lowest point B toward the second pipe section 72. As shown in FIG. 6, there is no portion which becomes horizontal in either of the first flow path 49b and the second flow path 49c. Accordingly, the vaporized coolant (such coolant is referred to below as bubbles) in the vicinity of the ejection apparatus 49 due to an increase in the temperature of the ejection apparatus 49, heads toward the first retaining section 81 or the second retaining section 82 via the first pipe section 71 or the second pipe section 72 without remaining inside the coolant flow path 49a. Here, the second flow path 49c is longer than the first flow path 49b as shown in FIG. 6. Accordingly, the bubbles which are heading to the second retaining section 82 are more numerous than bubbles which are heading to the first retaining section 81.

The first retaining section 81 retains coolant and is connected to the first pipe section 71 above the ejection apparatus 49. The second retaining section 82 retains coolant and is connected to the second pipe section 72 above the ejection apparatus 49. The first retaining section 81 and the second retaining section 82 are supported by a base plate 83. The first retaining section 81, the second retaining section 82, and the base plate 83 are integrally formed. The first retaining section 81, the second retaining section 82, and the base plate 83 which are integrally formed in this manner are referred to as a retaining unit 80.

Figure 7:
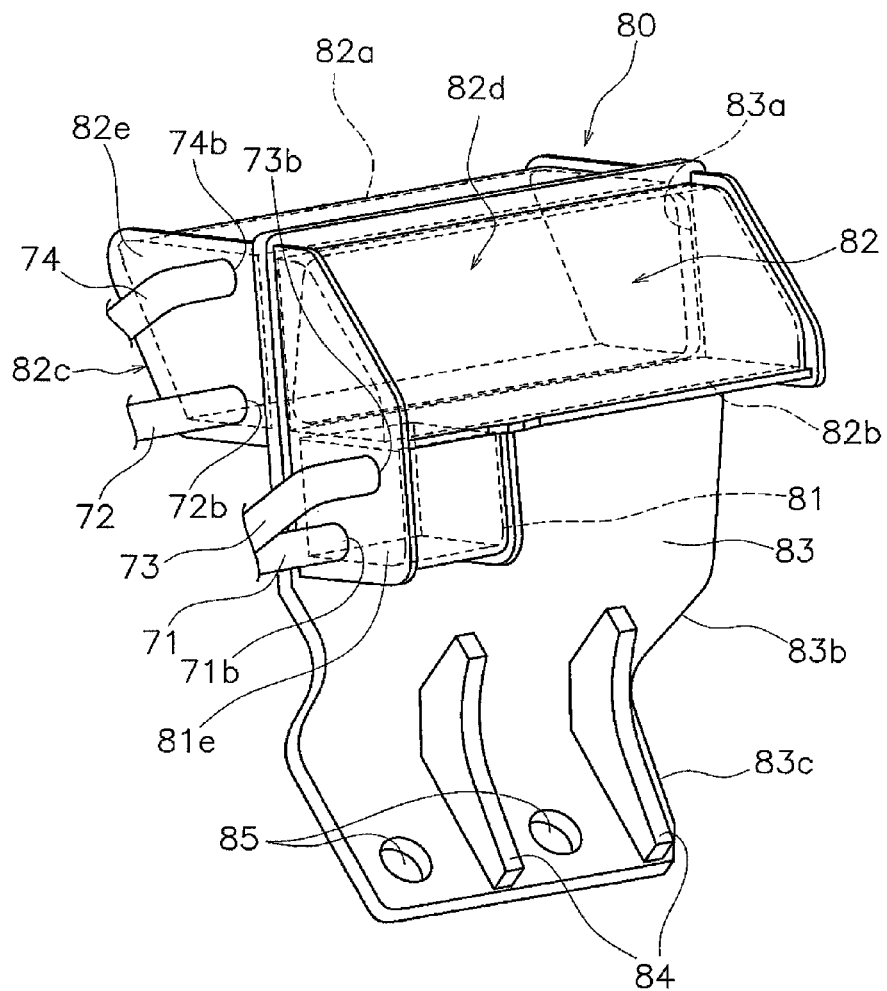
FIG. 7 is an enlarged perspective view of a retaining unit according to an embodiment of the present invention.

FIG. 7 is an enlarged perspective view of the retaining unit 80 according to an embodiment of the present invention. In FIG. 7, the inner sections of the first retaining section 81 and the second retaining section 82 are displayed using a dotted line. As shown in FIG. 7, the first retaining section 81 has a substantially cuboid shape. The second retaining section 82 has a quadrangular prism shape, a bottom surface of which is substantially a parallelogram (The bottom surface is the side surface in FIG. 7). The second retaining section 82 has a larger capacity than the first retaining section 81. In addition, the second retaining section 82 is arranged above the first retaining section 81. The bottom surface of the second retaining section 82 abuts against the top surface of the first retaining section 81. That is, the lower end of the second retaining section 82 is above the upper end of the first retaining section 81. Accordingly, the lower end of the second retaining section 82 is above the lower end of the first retaining section 81. Hence, the fourth connecting section 72b is above the third connecting section 71b. The second retaining section 82 includes a first sub-tank 82a which is connected to one surface of the base plate 83 and a second sub-tank 82b which is connected to the other surface of the base plate 83. The second sub-tank 82b is adjacent to the first retaining section 81. That is, the second sub-tank 82b is connected to the same surface as the surface of the base plate 83 with which the first retaining section 81 is connected. The first sub-tank 82a is connected to the surface of the opposite side to the surface of the base plate 83 with which the first retaining section 81 is connected. Here, with the second connection pipe 43 as a reference, the first sub-tank 82a is connected to the surface of the base plate 83 which is a first side facing the second connection pipe 43. The second sub-tank 82b and the first retaining section 81 are connected to the surface of the base plate 83 which is a second side opposite to the first side. An opening 83a which links the first sub-tank 82a and the second sub-tank 82b is provided in the base plate 83. That is, the second retaining section 82 forms one retaining section where the first sub-tank 82a and the second sub-tank 82b are linked.

The second retaining section 82 includes a first inclined surface 82c and a second inclined surface 82d. As shown in FIG. 5, the first inclined surface 82c is an inclined surface which corresponds to the cylindrical side surface of the second connection pipe 43. That is, the first inclined surface 82c is inclined so as not to come into contact with the cylindrical side surface of the second connection pipe 43. In addition, a point PQRS in FIG. 5 corresponds to a point PQRS of FIG. 2. According to this, the second inclined surface 82d is an inclined surface which corresponds to the convex section inclined surface 143. That is, the second inclined surface 82d is inclined so as not to come into contact with the convex section inclined surface 143. In addition, a portion of the second retaining section 82 is included in the space in the inner section of the convex section 141 as shown in FIG. 4. That is, at least one of a portion of the first retaining section 81 or a portion of the second retaining section 82 is included in the space in the inner section of the convex section 141.

As shown in FIG. 6, the base plate 83 extends downward while curving from the vicinity of the lower end of the first retaining section 81. In more detail, the base plate 83 has a first curved section 83b which curves so as to approach the side surface of the second connection pipe 43 from the vicinity of the lower end of the first retaining section 81 and a second curved section 83c which curves substantially perpendicularly with respect to the first curved section 83b. The base plate 83 may further include ribs 84 which connect the first curved section 83b and the second curved section 83c. Here, although not shown in the diagram, the base plate 83 may further include ribs which connect the first curved section 83b and the lower end of the first sub-tank 82a. A support member 86 which will be described later and an attachment hole 85 for connecting using a bolt are provided at the lower end of the base plate 83 (refer to FIG. 4).

As shown in FIG. 4 and FIG. 6, the support member 86 is attached to a flange 42a of the second exhaust treatment apparatus 42 using a bolt. The support member 86 has three surfaces which are perpendicular to each other, with the flange 42a connected to one of the surfaces, the base plate 83 (in detail, the second curved section 83c) connected to another surface, and the remaining surface in contact with the lower end of the base plate 83. By providing the support member 86 in this manner, the retaining unit 80 is supported by the second exhaust treatment apparatus 42. By fixing the retaining unit 80 in this manner, the orientations of the first pipe section 71 and the second pipe section 72 are also fixed.

As shown in FIG. 3, FIG. 6, and FIG. 7, a third pipe section 73 which is connected to the engine 31 is connected to the first retaining section 81 and a fourth pipe section 74 which is connected to the engine 31 is connected to the second retaining section 82. That is, the exhaust treatment unit 40 is further provided with the third pipe section 73 and the fourth pipe section 74. As shown in FIG. 6, the third pipe section 73 is connected to the first retaining section 81 at a fifth connecting section 73b. The fourth pipe section 74 is connected to the second retaining section 82 at a sixth connecting section 74b. The fifth connecting section 73b is positioned above the third connecting section 71b. That is, the third pipe section 73 is connected to the first retaining section 81 above the first pipe section 71. The sixth connecting section 74b is positioned above the fourth connecting section 72b. That is, the fourth pipe section 74 is connected to the second retaining section 82 above the second pipe section 72.

As shown in FIG. 7, the third connecting section 71b and the fifth connecting section 73b are connected to a common side surface 81e of the first retaining section 81. The side surface 81e is the side surface which is nearest to the ejection apparatus 49 out of the side surfaces of the first retaining section 81. Here, the distances between each of the side surfaces of the first retaining section 81 and the ejection apparatus 49 are defined by the distances between the central positions of each of the side surfaces and the central position of the ejection apparatus 49. In addition, the fourth connecting section 72b and the sixth connecting section 74b are connected to a common side surface 82e of the second retaining section 82. The side surface 82e is the side surface which is nearest to the ejection apparatus 49 out of the side surfaces of the second retaining section 82. Here, the distances between each of the side surfaces of the second retaining section 82 and the ejection apparatus 49 are defined by the distances between the central positions of each of the side surfaces and the central position of the ejection apparatus 49.

Figure 8:
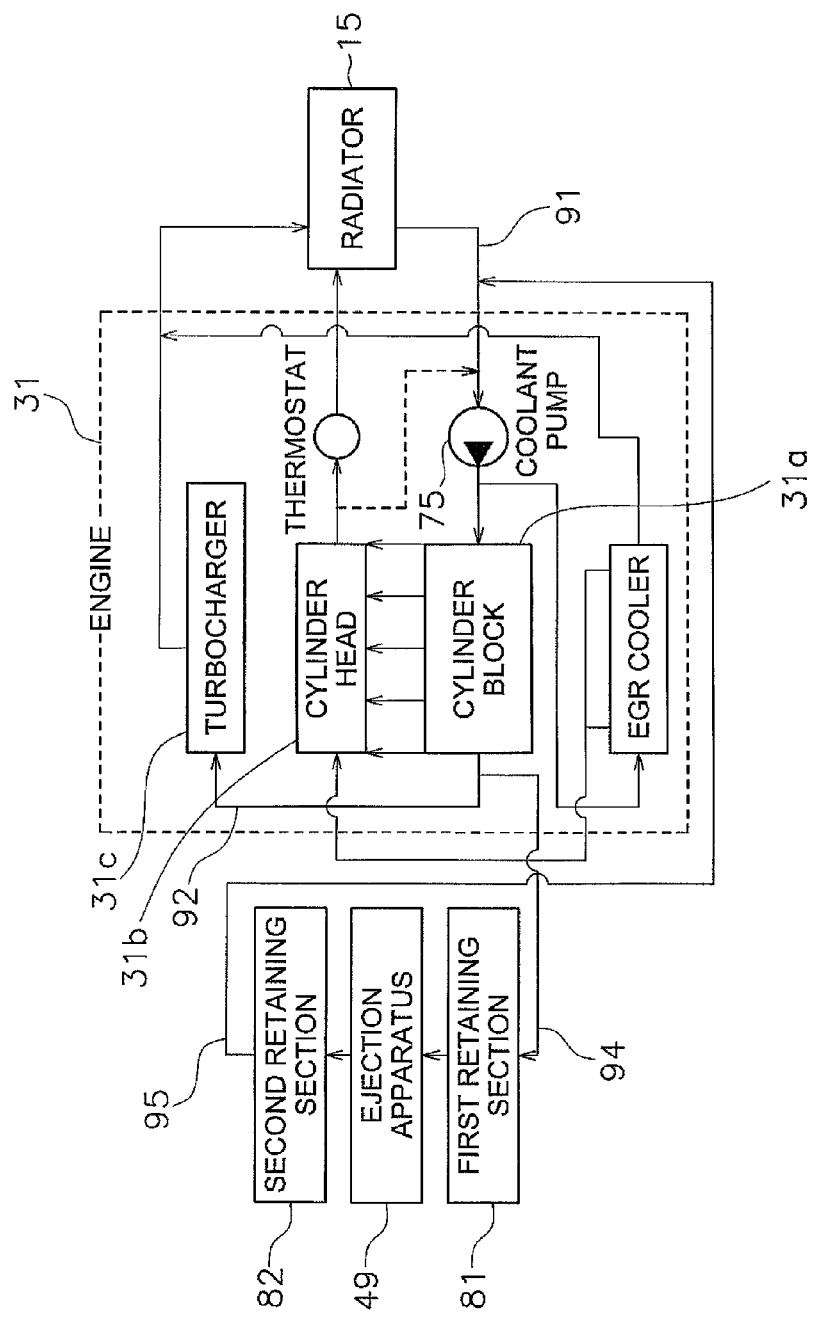
FIG. 8 is a circuit diagram which illustrates the entirety of a coolant flow path.

FIG. 8 is a circuit diagram which illustrates an entire flow path of the coolant. The main flow path of the coolant which relates to the present embodiment will be described based on FIG. 8. The work vehicle 1 is mainly provided with a first coolant channel 91, a second coolant channel 92, a third coolant channel 93, a coolant supply channel 94, and a coolant returning channel 95. Here, the coolant supply channel 94 includes the first pipe section 71 and the third pipe section 73 described above. The coolant returning channel 95 includes the second pipe section 72 and the fourth pipe section 74 described above.

The first coolant channel 91 connects the radiator 15 and a water jacket of a cylinder block 31a and feeds the coolant which is cooled by the radiator 15 to the water jacket of the cylinder block 31a. Here, the coolant pump 75 is connected to the middle of the first coolant channel 91. The coolant pump 75 is driven by receiving driving force from the engine 31 and the coolant is supplied to the ejection apparatus 49 via the coolant supply channel 94 (the third pipe section 73 and the first pipe section 71) and the first retaining section 81.

Figure 9:
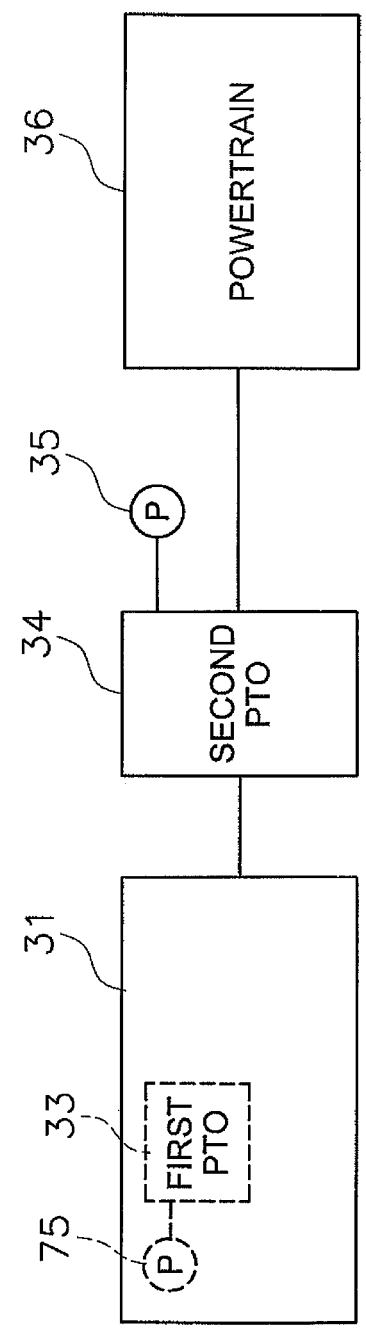
FIG. 9 is a diagram which illustrates engine driving force distribution.

With reference to FIG. 9, the engine 31 is provided with a first power take-off (PTO) 33 and the coolant pump 75. The output from the engine 31 is transferred to the first PTO 33 and a second power take-off (PTO) 34 which is linked to the engine. The first PTO 33 drives the coolant pump 75 using the output from the engine 31 which is transferred. The coolant pump 75 stops according to stopping of the engine 31. The output which is transferred to the second PTO 34 is transferred to a hydraulic pump 35 for driving a cooling fan and a powertrain 36 for driving the traveling apparatus 3.

The second coolant channel 92 connects the water jacket of the cylinder block 31a and the coolant flow path of a turbo charger 31c and feeds the coolant from the water jacket of the cylinder block 31a to the coolant flow path of the turbo charger 31c. The coolant supply channel 94 branches off from the second coolant channel 92. The coolant supply channel 94 connects the second coolant channel 92 and the coolant flow path of the ejection apparatus 49 and feeds the coolant from the second coolant flow channel 92 to the coolant flow path of the ejection apparatus 49 (in detail, the first pipe section 71 and the third pipe section 73). That is, the third pipe section 73 guides the coolant for cooling the ejection apparatus 49 to the first retaining section 81. Then, the first pipe section 71 guides the coolant for cooling the ejection apparatus 49 to the ejection apparatus 49. Hence, the ejection apparatus 49 is cooled.

The coolant returning channel 95 connects the coolant flow path (in detail, the second pipe section 72 and the fourth pipe section 74) of the ejection apparatus 49 and the first coolant channel 91 and feeds the coolant from the coolant flow path of the ejection apparatus 49 to the first coolant channel 91. Hence, the coolant after cooling the ejection apparatus 49 is discharged from inside the coolant flow path of the ejection apparatus 49. That is, the second pipe section 72 discharges coolant from the ejection apparatus 49. Then, the fourth pipe section 74 guides the coolant which is discharged from the ejection apparatus 49 to the engine 31.

Features

The exhaust treatment unit 40 and the work vehicle 1 according to the present embodiment have the following features.

(1) The exhaust treatment unit 40 and the work vehicle 1 according to the present invention are provided with the first retaining section 81 and the second retaining section 82 which retain coolant and are positioned above the ejection apparatus 49. Then, the first retaining section 81 and the second retaining section 82 are connected to the ejection apparatus 49 respectively via the first pipe section 71 and the second pipe section 72 which extend upward from the ejection apparatus 49. As a result, heat convection is generated. In the heat convection, the coolant which is vaporized in the vicinity of the ejection apparatus 49 rises to the first retaining section 81 or the second retaining section 82 and is cooled, and the coolant which remains in the first retaining section 81, the second retaining section 82, the first pipe section 71, or the second pipe section 72 falls to the ejection apparatus 49. Accordingly, the coolant in the vicinity of the ejection apparatus 49 is suppressed from being vaporized even if the coolant pump 75 is not operating when the engine 31 is stopped. Hence, generation of deposits from the reducing agent is suppressed. In addition, it is possible to prevent the ejection apparatus 49 from being excessively heated.

(2) In a case where bubbles are generated in the vicinity of the ejection apparatus 49 due to the coolant vaporization, bubbles from the second connecting section 72a toward the second retaining section 82 are more numerous than bubbles from the first connecting section 71a toward the first retaining section 81. Then, the second retaining section 82 has a larger capacity than the first retaining section 81. Due to these relationships, the liquid coolant moves efficiently toward the ejection apparatus 49 and it is possible to suppress vaporization of the reducing agent solution after the engine stops.

(3) The first retaining section 81, the second retaining section 82, and the base plate 83 are integrally formed. Accordingly, installation of the first retaining section 81 and the second retaining section 82 is facilitated.

(4) The second retaining section 82 includes the first sub-tank 82a which is connected to one surface of the base plate 83 and the second sub-tank 82b which is connected to the other surface of the base plate 83. Then, an opening 83a which links the first sub-tank 82a and the second sub-tank 82b is provided in the base plate 83. Accordingly, the second retaining section 82 which has a considerably larger capacity than the first retaining section 81 is arranged such that the capacity at one side of the base plate 83 is substantially equal to the capacity of the other side. Therefore, the second retaining section 82 is stably supported by the base plate 83.

(5) The fourth connecting section 72b which connects the second pipe section 72 to the second retaining section 82 is above the third connecting section 71b which connects the first pipe section 71 to the first retaining section 81. Accordingly, when the coolant pump 75 is stopped, the liquid coolant in the second retaining section 82 flows more easily to the ejection apparatus 49 than the liquid coolant in the first retaining section 81. Consequently, an excessive rise in the temperature of the ejection apparatus 49 after the engine stops is suppressed and generation of deposits in the ejection apparatus 49 is suppressed.

(6) The lower end of the second retaining section 82 is above the lower end of the first retaining section 81. It is further desirable that the lower end of the second retaining section 82 be above the upper end of the first retaining section 81. According to this structure, when the coolant pump 75 is stopped, the liquid coolant in the second retaining section 82 flows more easily to the ejection apparatus 49 than the liquid coolant in the first retaining section 81 due to a difference of head pressure. As a result, it is possible to suppress solvent of the reducing agent solution becoming a gas and precipitation of the reducing agent after the engine stops.

(7) The first pipe section 71 and the third pipe section 73 are connected to the side surface 81e of the first retaining section 81. The second pipe section 72 and the fourth pipe section 74 are connected to the side surface 82e of the second retaining section 82. Hence, the works of attaching, detaching, and arranging the first to the fourth pipe sections 71 to 74 are facilitated.

(8) The side surface 81e is the side surface nearest to the ejection apparatus 49 out of the side surfaces of the first retaining unit 81. The side surface 82e is the side surface nearest to the ejection apparatus 49 out of the side surfaces of the second retaining section 82. Hence, it is possible to shorten the length of the first pipe section 71 and the second pipe section 72 such that extending the first pipe section 71 upward toward the first retaining section 81 and extending the second pipe section 72 upward toward the second retaining section 82 are facilitated.

(9) The third pipe section 73 is connected to the first retaining section 81 above the first pipe section 71. The fourth pipe section 74 is connected to the second retaining section 82 above the second pipe section 72. Hence, since it is possible to connect the first pipe section 71 and the second pipe section 72 which are connected to the ejection apparatus 49 at positions which are low (in the vicinity of a bottom section) in the first retaining section 81 and the second retaining section 82. Therefore, even if bubbles enter the retaining sections due to stopping of the coolant pump 75, the coolant which is able to be supplied to the ejection apparatus 49 is more reliably secured compared with connections at high positions.

(10) The coolant pump 75 is driven by receiving driving force from the engine 31. Hence, it is not necessary to install a new power source other than the engine 31. In addition, in a case where the coolant pump 75 which stops together with the engine 31 is used for supplying the coolant, the exhaust treatment unit 40 according to the present embodiment is particularly effective.

(11) At least one of a portion of the first retaining section or a portion of the second retaining section 82 is included in the space in the inner section of the convex section 141. Hence, the retaining unit 80 which protrudes above the engine 31 is arranged inside the convex section 141 such that the height of the base section 144 can be lowered. Consequently, it is possible to secure a wide front view for the operator of the work vehicle 1.

Modified Examples

Above, embodiments of the present invention are described but the present invention is not limited to the embodiments described above and various types of modifications are possible without departing from the gist of the present invention.

Figure 10:
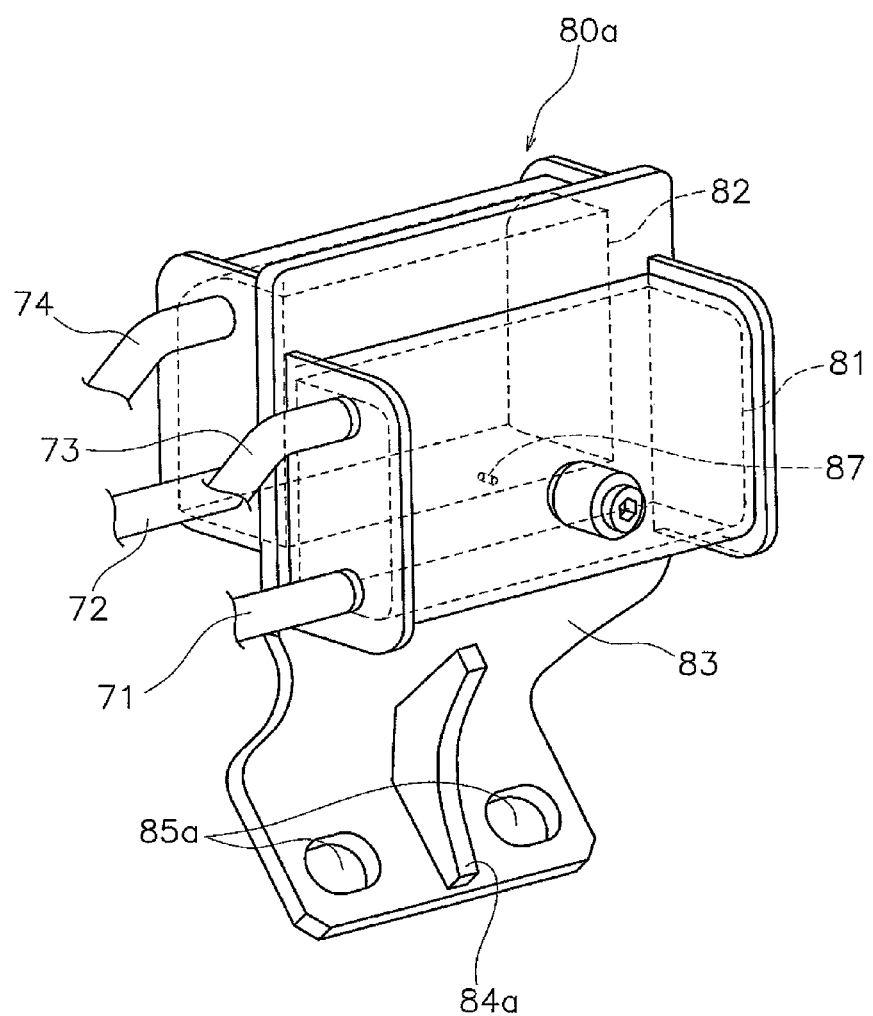
FIG. 10 is an enlarged perspective diagram which illustrates a modified example of a retaining unit.

FIG. 10 is an enlarged perspective diagram which illustrates a modified example 80a of the retaining unit 80. In FIG. 10, the inner sections of the first retaining section 81 and the second retaining section 82 are displayed using a dotted line. In the present modified example, the first retaining section 81 and the second retaining section 82 have substantially cuboid shapes. The size of the first retaining section 81 is substantially equal to the second retaining section 82. In addition, unlike FIG. 7, the upper end of the first retaining section 81 is above the lower end of the second retaining section 82. The first retaining section 81 is connected to one surface of the base plate 83 and the second retaining section 82 is connected to the other surface of the base plate 83. With the second connection pipe 43 as a reference, the second retaining section 82 is connected to a surface of a first side of the base plate 83, the first side facing the second connection pipe 43. The first retaining section 81 is connected to a surface of a second side of the base plate 83 which is opposite to the first side. A connecting hole 87 which connects the first retaining section 81 and the second retaining section 82 is provided in the base plate 83. That is, the first retaining section 81 and the second retaining section 82 are connected.

Since the first retaining section 81 and the second retaining section 82 are connected, the liquid coolant flows into the second retaining section 82 from the first retaining section 81 when vaporized coolant accumulates in the second retaining section 82 and the height of the liquid coolant is lower than the height of the first retaining section 81. Hence, it is possible to substantially increase the amount of coolant in the second retaining section.

In addition, the first retaining section 81 is connected to one surface of the base plate 83 and the second retaining section 82 is connected to the other surface of the base plate 83. The first retaining section 81 and the second retaining section 82 are substantially the same size. Accordingly, the first retaining section 81 and the second retaining section 82 are stably supported by the base plate 83.

The first retaining section 81, the second retaining section 82, and the base plate 83 are integrally formed. Then, the connecting hole 87 which connects the first retaining section 81 and the second retaining section 82 is provided in the base plate 83. Accordingly, installation of the first retaining section 81, the second retaining section 82, and the joining portion is facilitated.

Here, the size of the connecting hole is configured to be small such that the coolant in the first retaining section 81 and the coolant in the second retaining section 82 hardly mix together while the coolant is circulated by the coolant pump 75 while the engine 31 is driven. In addition, since the weight balance is different in the present modified example 80a due to the first retaining section 81 being larger than the retaining unit 80, the number of ribs 84a is one and additionally the shape of the attachment hole 85a has an elliptical shape.

Here, according to both of the retaining unit 80 illustrated by the present embodiment and the modified example 80a described above, the first retaining section 81, the second retaining section 82, and the base plate 83 are all integrally formed, but the first retaining section 81 and the second retaining section 82 may be formed separately. In this case, in the modified example 80a described above, the first retaining section 81 and the second retaining section 82 may be connected using a small tube instead of the connecting hole 87.

According to the embodiments and modified example described above, cases where the first retaining section 81 and the second retaining section 82 are tanks were exemplified, but the present invention is not limited thereto. For example, the first retaining section 81 and the second retaining section 82 may be formed by thickening the diameters of some portions of the pipes in the coolant supply channel 94 and the coolant returning channel 95 and allowing coolant to retain in the inner sections of the thickened pipes.

In the embodiment described above, the first pipe section 71 and the second pipe section 72 extend obliquely upward from the ejection apparatus 49, but may extend perpendicularly upward from the ejection apparatus 49.

In the embodiment described above, the first pipe section 71 and the second pipe section 72 are supported only by the retaining unit 80, but the first pipe section 71 and the second pipe section 72 may be supported so as to extend obliquely upward by further using a separate support member.

The support member 86 is fixed by the flange 42a in the second exhaust treatment apparatus 42, but the fixing location of the support member 86 is not limited thereto. For example, the support member 86 may be fixed by the second connection pipe 43, a vehicle body frame, the engine hood 14, or the like. The shape of the support member 86 may be another shape. In addition, the fixing method of the support member 86 and the retaining unit 80 may be a means which is different from a bolt (for example, a hook, welding, or the like).

FIG. 5 illustrates an example where a portion of the retaining unit 80 is included in the space in the inner section of the convex section 141, but the entirety of the retaining unit 80 may be outside the inner section of the convex section 141. That is, the retaining unit 80 may be arranged below the convex section 141.

The configuration of the exhaust treatment unit 40 is not limited to the configuration described above. For example, the first exhaust treatment apparatus 41 may be another exhaust treatment apparatus such as a diesel oxidation catalyst (DOC Diesel Oxidation Catalyst) instead of a diesel particulate filter apparatus. The first exhaust treatment apparatus 41 and the second exhaust treatment apparatus 42 may be arranged at positions which are different to the positions described above. The shapes of the first exhaust treatment apparatus 41 and the second exhaust treatment apparatus 42 are not limited to a cylindrical shape or the like, and may be other shapes such as an elliptical shape, a rectangular shape, or the like. The positions of the first connection pipe 51, the exhaust pipe 8a, the air intake pipe 8b, and the air cleaner 32 may be arranged at positions different from the positions described above.

The right and left sides of the layout inside the engine compartment 8 may be reversed with respect to the layout described above. For example, the first exhaust treatment apparatus 41 may be arranged at the left side in the vehicle width direction and the second exhaust treatment apparatus 42 may be arranged at the right side. In this case, the attachment positions of the ejection apparatus 49, the first connection pipe 51, and the second connection pipe 43 are changed corresponding to this arrangement.

In the embodiment described above, a bulldozer was exemplified as the work vehicle 1, but the work vehicle 1 is not limited thereto. For example, it is possible to apply the present invention in the same manner even when the work vehicle 1 is a hydraulic excavator, a wheel loader, or a motor grader.

According to the present invention, it is possible to provide a work vehicle where coolant in the vicinity of an ejection apparatus is prevented from being vaporized even if a coolant pump is not operating when an engine is stopped.

The invention claimed is:

1. An exhaust treatment unit configured to treat exhaust from an engine, the exhaust treatment unit comprising:
    a selective catalytic reduction apparatus configured to treat exhaust from the engine;
    a connection pipe installed between the engine and the selective catalytic reduction apparatus;
    an ejection apparatus attached to the connection pipe, the ejection apparatus being configured to eject a reducing agent into the exhaust supplied to the selective catalytic reduction apparatus;
    a first pipe section configured to guide coolant to the ejection apparatus to cool the ejection apparatus;
    a second pipe section configured to discharge the coolant from the ejection apparatus;
    a first coolant tank connected to the first pipe section above the ejection apparatus;
    a second coolant tank connected to the second pipe section above the ejection apparatus;
    a third pipe section connecting the engine and the first coolant tank, the third pipe section being configured to guide coolant to the first coolant tank to cool the ejection apparatus;
    a fourth pipe section connecting the engine and the second coolant tank, the fourth pipe section being configured to guide coolant discharged from the ejection apparatus to the engine; and
    a coolant pump configured to be driven by receiving driving force from the engine, the coolant pump being configured to supply the coolant to the ejection apparatus via the first pipe section,
    the first pipe section extending upward from a first connecting section of the first pipe section and the ejection apparatus toward the first coolant tank,
    the second pipe section extending upward from a second connecting section of the second pipe section and the ejection apparatus toward the second coolant tank,
    the first pipe section and the third pipe section being connected to a first side surface of the first coolant tank, and
    the second pipe section and the fourth pipe section being connected to a second side surface of the second coolant tank.

2. The exhaust treatment unit according to claim 1, wherein the second coolant tank has a larger capacity than the first coolant tank and the second coolant tank is arranged above the first coolant tank.

3. The exhaust treatment unit according to claim 2, further comprising:
    one base plate supporting the first coolant tank and the second coolant tank,
    the first coolant tank, the second coolant tank, and the base plate being integrally formed.

4. The exhaust treatment unit according to claim 3, wherein the second coolant tank has a first sub-tank connecting with one surface of the base plate and a second sub-tank connecting with an other surface of the base plate, and
    an opening linking the first sub-tank and the second sub-tank is provided in the base plate.

5. The exhaust treatment unit according to claim 1, wherein the first coolant tank and the second coolant tank are connected.

6. The exhaust treatment unit according to claim 5, further comprising:
    one base plate supporting the first coolant tank and the second coolant tank,
    the first coolant tank connected to one surface of the base plate, and
    the second coolant tank connected to an other surface of the base plate.

7. The exhaust treatment unit according to claim 6, wherein the first coolant tank, the second coolant tank, and the base plate are integrally formed, and
    a hole connecting the first coolant tank and the second coolant tank is provided in the base plate.

8. The exhaust treatment unit according claim 1, wherein bubbles are generated in a vicinity of the ejection apparatus due to coolant vaporization, and bubbles disposed from the second connecting section toward the second coolant tank are more numerous than bubbles disposed from the first connecting section toward the first coolant tank.

9. The exhaust treatment unit according to claim 1, wherein
a third connecting section connects the first pipe section to the first coolant tank,
a fourth connecting section connects the second pipe section to the second coolant tank, and
the fourth connecting section is above the third connecting section.

10. The exhaust treatment unit according to claim 9, wherein
a lower end of the second coolant tank is above a lower end of the first coolant tank.

11. The exhaust treatment unit according to claim 1, wherein
the first side surface of side surfaces of first coolant tank is nearest to the ejection apparatus, and
the second side surface of side surfaces of the second coolant tank is nearest to the ejection apparatus.

12. The exhaust treatment unit according to claim 1, wherein
the third pipe section is connected to the first coolant tank above the first pipe section, and
the fourth pipe section is connected to the second coolant tank above the second pipe section.

13. A work vehicle including the exhaust treatment unit of claim 1, the work vehicle further comprising:
an engine which outputs driving force, and
a working implement.

* * * * *